(12) United States Patent
Wang et al.

(10) Patent No.: US 10,331,230 B2
(45) Date of Patent: Jun. 25, 2019

(54) DISTANCE DETECTING MECHANISM AND NAVIGATION DEVICE WITH DISTANCE DETECTING FUNCTION

(71) Applicant: PixArt Imaging Inc., Hsin-Chu (TW)

(72) Inventors: Tsung-Fa Wang, Hsin-Chu (TW); Yen-Chang Wang, Hsin-Chu (TW); Shih-Wei Kuo, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 186 days.

(21) Appl. No.: 15/632,381

(22) Filed: Jun. 25, 2017

(65) Prior Publication Data

US 2018/0232067 A1    Aug. 16, 2018

(30) Foreign Application Priority Data

Feb. 15, 2017    (TW) .............................. 106104839 A (51) Int. Cl.
| | |
|---|---|
| *G06F 3/0346* | (2013.01) |
| *F21V 31/00* | (2006.01) |
| *G06F 3/03* | (2006.01) |
| *G06F 3/038* | (2013.01) |
| *G06F 3/0354* | (2013.01) |

(52) U.S. Cl.
CPC .......... *G06F 3/0346* (2013.01); *G06F 3/0317* (2013.01); *G06F 3/0383* (2013.01); *G06F 3/03543* (2013.01); *F21V 31/005* (2013.01)

(58) Field of Classification Search
CPC .... G06F 3/0346; G06F 3/0317; G06F 3/0383; G06F 3/03543; F21V 31/005
USPC .............................................. 250/559.38, 239
See application file for complete search history.

(56) References Cited

U.S. PATENT DOCUMENTS

| | | | | |
|---|---|---|---|---|
| 9,092,074 B2* | 7/2015 | Yin | ..................... | G06F 3/03543 |
| 10,048,774 B2* | 8/2018 | Lai | ..................... | G06F 3/03543 |

* cited by examiner

*Primary Examiner* — Seung C Sohn
(74) *Attorney, Agent, or Firm* — Winston Hsu (57) ABSTRACT

A navigation device with distance detecting function can utilize a distance detecting mechanism to detect a distance relative to a working surface. The distance detecting mechanism includes a base, a connecting component, a feature unit and a detection unit. The connecting component partly protrudes from the base. The connecting component optionally contacts against or is spaced from the working surface to generate a distance variation relative to the base along an axial direction. The feature unit is disposed on the connecting component. The detection unit is connected to the base. The detection unit can detect parameter difference of the feature unit according to the distance variation of the connecting component relative to the base, so as to determine the distance between the working surface and a bottom of the base via the parameter difference.

20 Claims, 7 Drawing Sheets

DISTANCE DETECTING MECHANISM AND NAVIGATION DEVICE WITH DISTANCE DETECTING FUNCTION

BACKGROUND OF THE INVENTION

1. Field of the Invention

The present invention relates to a distance detecting mechanism and a navigation device with distance detecting function, and more particularly, to a distance detecting mechanism capable of detecting an accurate distance relative to a working surface and a related navigation device with distance detecting function.

2. Description of the Prior Art

A computer-use navigation device (such as an optical mouse) not only determines coordinate variation by detecting a surface feature on the working surface, but also determines whether the optical mouse is lifted up or lowered upon the working surface via a detection result of the surface feature. The conventional lifting height detecting technique detects a distance variation between the optical mouse and the working surface in accordance with feature difference of the surface feature on the working surface, so that the material, surface roughness, dirty and/or dust on the working surface affects a parameter value of the surface feature, and cannot acquire an identical determination result about the lifting height due to interference of the working surface with diverse surface property. The lifting height detecting technique of the conventional optical mouse is hard to accurately detect the distance variation between the mouse and the working surface.

SUMMARY OF THE INVENTION

The present invention provides a distance detecting mechanism capable of detecting an accurate distance relative to a working surface and a related navigation device with distance detecting function for solving above drawbacks.

According to the claimed invention, a distance detecting mechanism capable of detecting a distance relative to a working surface is disclosed. The distance detecting mechanism includes a base, a connecting component, a feature unit and a detection unit. The connecting component partly protrudes from the base, and the connecting component movably contacts against or is spaced from the working surface to generate a distance variation relative to the base along an at least one axial direction. The feature unit is disposed on the connecting component. The detection unit is connected to the base. The detection unit detects parameter difference of the feature unit in accordance with the distance variation of the connecting component relative to the base, so as to determine the distance between the working surface and a bottom surface of the base via the parameter difference.

According to the claimed invention, a navigation device having distance detecting function and capable of detecting a distance relative to a working surface is disclosed. The navigation device includes a housing, a coordinate detecting module and a distance detecting mechanism. The coordinate detecting module is disposed inside the housing and utilized to detect a coordinate movement of the housing relative to the working surface. The distance detecting mechanism is disposed inside the housing. The distance detecting mechanism includes a base, a connecting component, a feature unit and a detection unit. The base is located on a bottom of the housing. The connecting component partly protrudes from the base, and the connecting component movably contacts against or is spaced from the working surface to generate a distance variation relative to the base along an at least one axial direction. The feature unit is disposed on the connecting component. The detection unit is connected to the base. The detection unit detects parameter difference of the feature unit in accordance with the distance variation of the connecting component relative to the base, so as to determine the distance between the working surface and a bottom surface of the base via the parameter difference.

The navigation device of the present invention has the distance detecting mechanism utilizing the detection unit to detect the known feature unit on the connecting component without effect by material, surface roughness, dirty or dust on the working surface, and then the distance detecting mechanism can accurately calculate the lifting height of the navigation device relative to the working surface via the distance variation between the connecting component and the base. The connecting component of the distance detecting mechanism can protrude from the base in a movable manner to contact against the working surface, so as to generate the said distance variation by the resilient recovering force of the resilient component while the navigation device is lifted up or lowered down. The distance detecting mechanism not only can calculate the lifting height of the navigation device, but also can press and smooth down the working surface as the working surface is made of thin material (such like the paper) to accordingly increase detection accuracy of the coordinate detecting module. The navigation device utilizes setting of the threshold to adjust sensitivity of the distance detecting mechanism, as along as the distance variation between the connecting component and the base is greater than the threshold, the navigation device can be represented as being lifted up even through the connecting component still contacts against the working surface (which means the navigation device is not represented as being lifted up on condition that the connecting component is not spaced from the working surface), and the coordinate detecting module stops outputting the coordinate value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
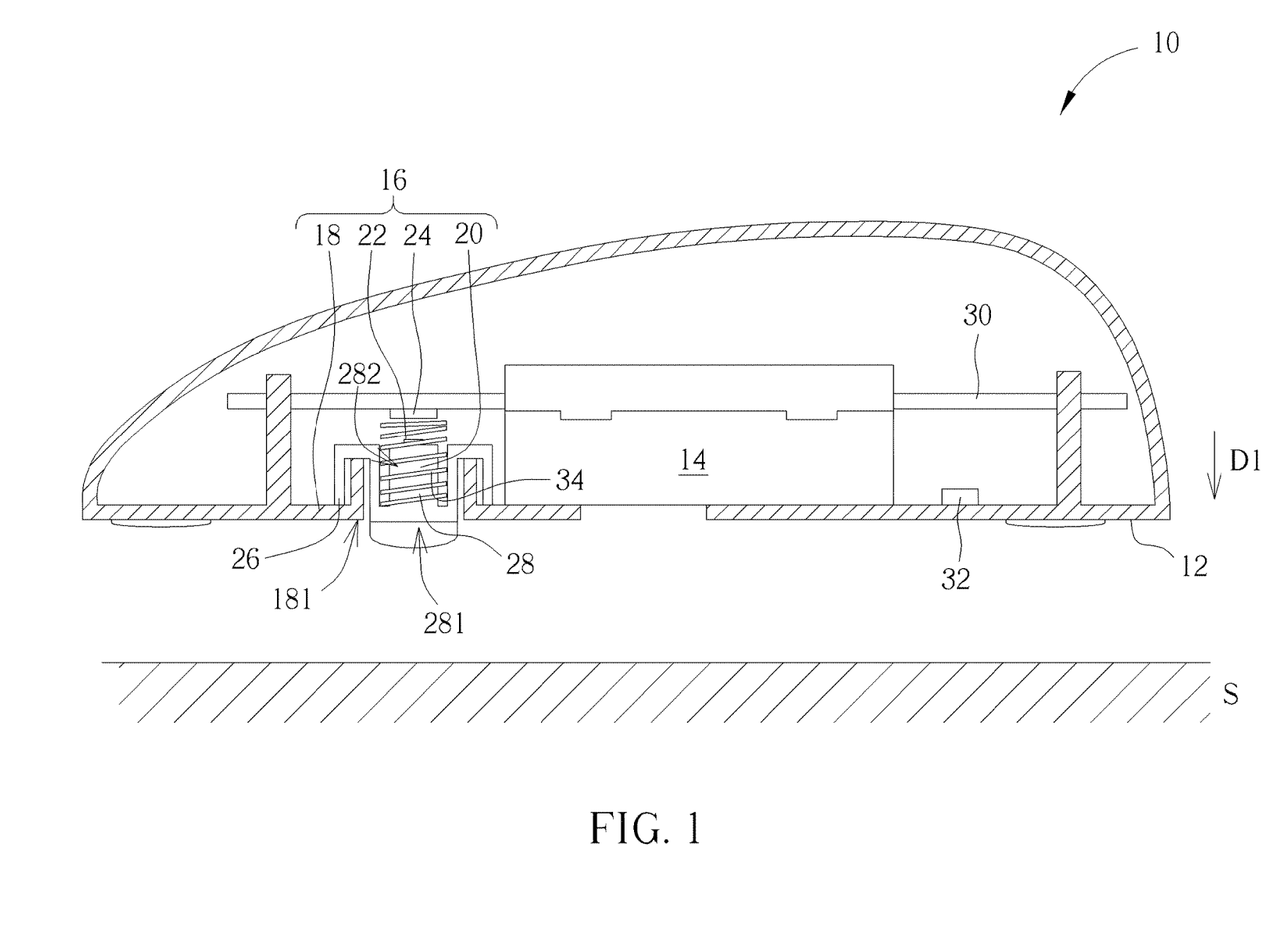
FIG. 1 and FIG. 2 are sectional views of a navigation device in different operation modes according to an embodiment of the present invention.
Figure 2:
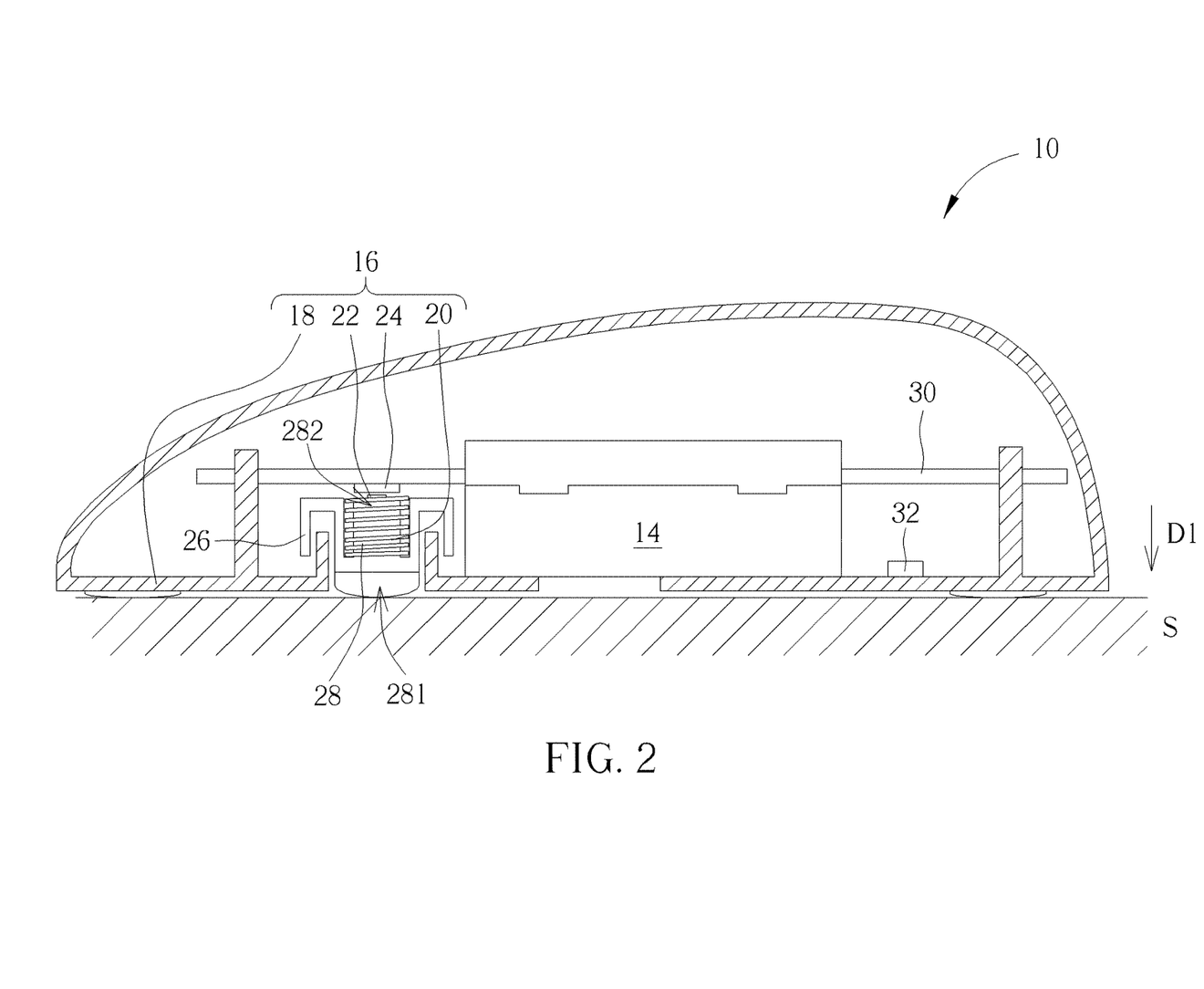

Please refer to FIG. 1 and FIG. 2. FIG. 1 and FIG. 2 are sectional views of a navigation device 10 in different operation modes according to an embodiment of the present invention. The navigation device 10 can be an optical mouse. The user moves the navigation device 10 upon a working surface S, and the navigation device 10 analyzes the moving track to determine an operation command from the user. The navigation device 10 includes a housing 12, a coordinate detecting module 14 and a distance detecting mechanism 16. The housing 12 is utilized to accommodate the coordinate detecting module 14 and the distance detecting mechanism 16 to provide dustproof and waterproof protection. The coordinate detecting module 14 can utilize an optical detecting technique to detect a feature pattern on the working surface S, or utilize a roller detecting technique to detect rotary information of the roller, so as to determine a coordinate movement of the housing 12 relative to the working surface S. While the navigation device 10 is slightly lifted up, which means the navigation device 10 is spaced from the working surface S without contact, the distance detecting mechanism 16 can be actuated to detect an accurate distance variation, so as to determine a lifting height of the navigation device 10 relative to the working surface S for triggering other possible application program.

The distance detecting mechanism 16 includes a base 18, a connecting component 20, a feature unit 22 and a detection unit 24. The base 18 is disposed on a bottom of the housing 12, or can be represented as a part of the bottom of the housing 12. The connecting component 20 partly protrudes from the base 18. In this embodiment, the connecting component 20 includes a sliding portion 26 slidably disposed on the base 18, and a main body portion 28 connected to the sliding portion 26. A first end 281 of the main body portion 28 protrudes from a bottom surface 181 of the base 18. Since the navigation device 10 is lifted up or lowered down, the connecting component 20 can contact against or be spaced from the working surface S optionally, and can generate the distance variation relative to the base 18 along an at least one axial direction D1. The feature unit 22 is disposed on the connecting component 20, and the detection unit 24 is disposed on a supporting component 30 of the base 18. While the connecting component 20 is moved relative to the base 18 to generate the distance variation, the detection unit 24 detects parameter difference of the feature unit 22 to determine a distance between the bottom surface 181 and the working surface S.

The foresaid axial direction D1 may be parallel to a planar normal vector of the bottom surface 181. In addition, the connecting component 20 can be movably disposed on the base 18 in an inclined placing manner, and a moving direction of the connecting component 20 relative to the base 18 can be intersected with a planar normal vector of the bottom surface 181; further, the moving path of the connecting component 20 relative to the base 18 can be designed as an arc curve or a spiral curve. The connecting component 20 moving along the distinctive direction not only can partly protrude from the bottom surface 181, but also can partly protrude from a lateral surface of the base 18 (or the housing 12) and be bent toward the bottom surface 181. Any design capable of moving the connecting component 20 to generate the distance variation while the navigation device 10 is lifted up or lowered down belongs to a scope of the distance detecting mechanism 16 in the present invention.

The navigation device 10 further includes a controller 32 electrically connected to the coordinate detecting module 14 and the distance detecting mechanism 16. As shown in FIG. 1, when the navigation device 10 is lifted up to move away from the working surface S, the resilient component 34 disposed on the main body portion 28 is released and its resilient recovering force pushes the connecting component 20 out of the base 18, the detection unit 24 detects parameter difference of the feature unit 22 in accordance with a movement of the connecting component 20 to acquire a distance between the bottom surface 181 and the working surface S. While the foresaid distance is greater than a threshold, the navigation device 10 is represented as being spaced from the working surface S, and the controller 32 can stop outputting a coordinate value generated by the coordinate detecting module 14. As shown in FIG. 2, while the navigation device 10 contacts and moves close to the working surface S, the resilient component 34 is compressed to store the resilient recovering force, the connecting component 20 is moved into the base 18, the detection unit 24 detects the parameter difference of the feature unit 22 to acquire the distance between the bottom surface 181 and the working surface S. As the foresaid distance is smaller than the threshold, the navigation device 10 is represented as being lowered upon the working surface S, and the controller 32 can output the coordinate value generated by the coordinate detecting module 14 accordingly.

Figure 3:
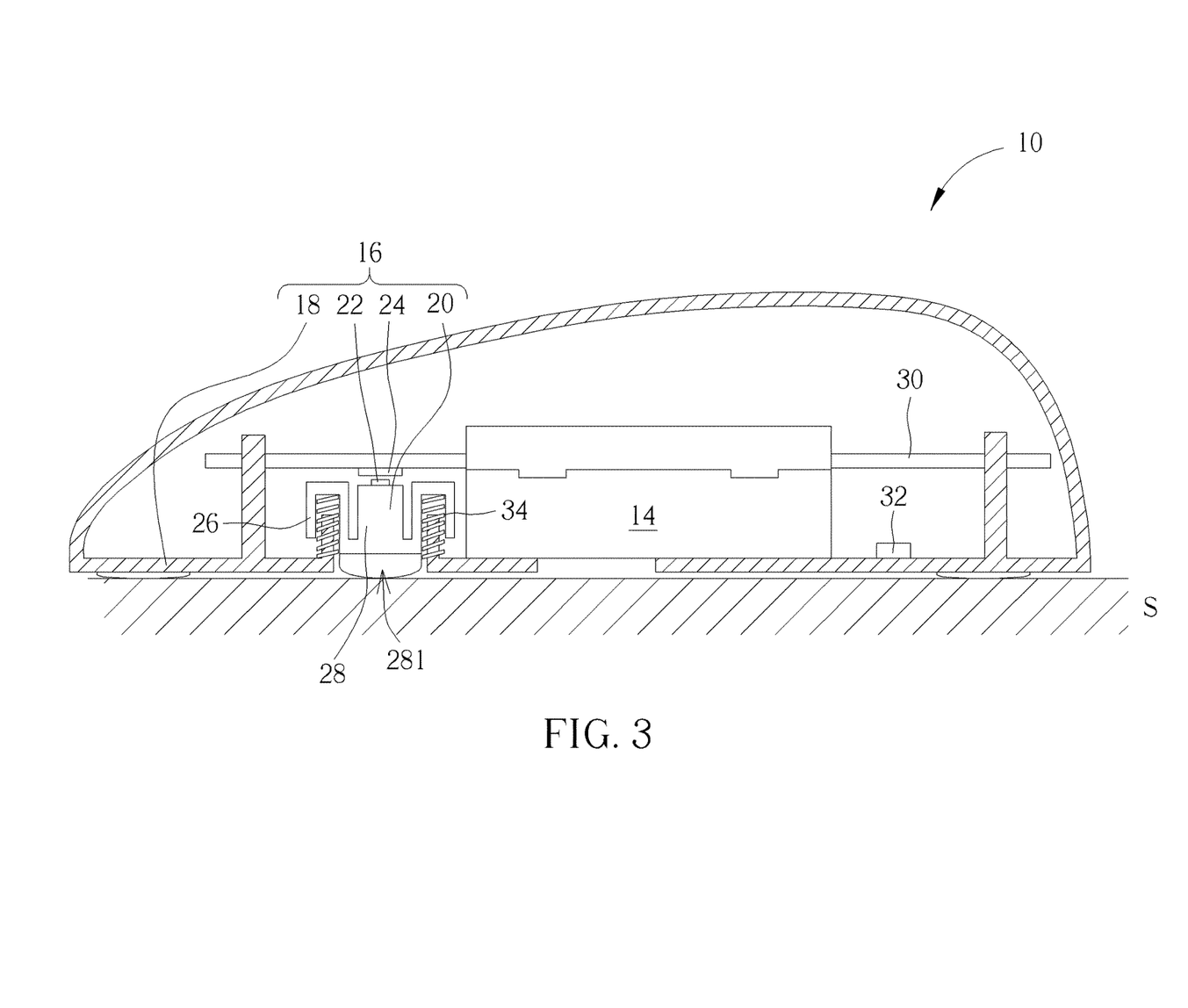
FIG. 3 and FIG. 4 respectively are sectional views of the navigation device in other possible variation according to the embodiment of the present invention.
Figure 4:
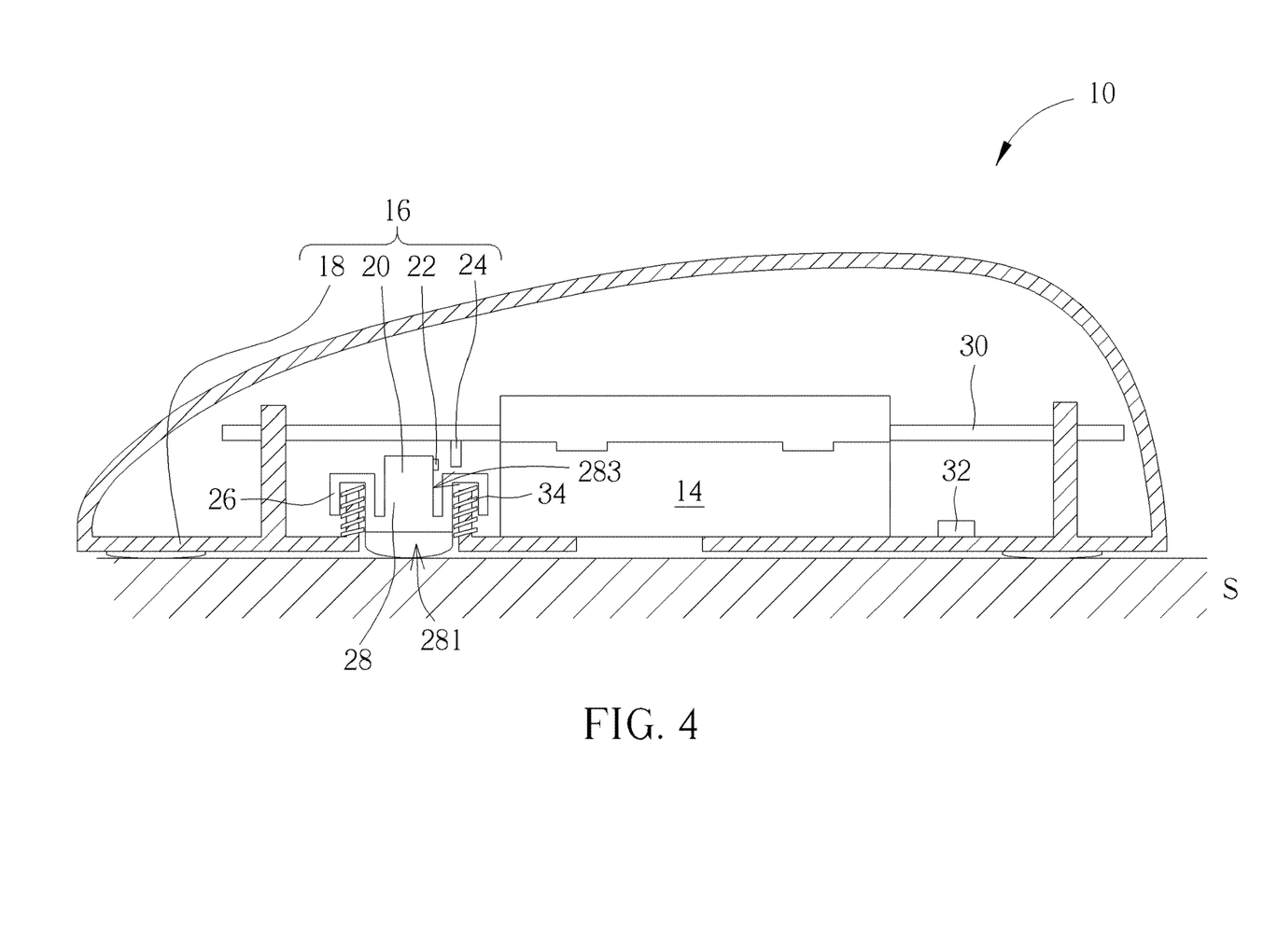

FIG. 3 and FIG. 4 respectively are sectional views of the navigation device 10 in other possible variation according to the embodiment of the present invention. The resilient component 34 shown in FIG. 1 and FIG. 2 is disposed on the main body portion 28; however, the resilient component 34 further can be disposed on the sliding portion 26, and two ends of the resilient component 34 respectively contact against the sliding portion 26 and the base 18, as shown in FIG. 3. Variation of the resilient component 34 is not limited to the above-mentioned embodiments, and depends on actual demand. The feature unit 22 shown in FIG. 1 and FIG. 2 is disposed on the second end 282 of the main body portion 28; as the movement of the connecting component 20, the detection unit 24 detects dimension and/or intensity difference of the feature unit 22 (for example, the detection unit 24 detects greater dimension and intensity while the feature unit 22 is close to the detection unit 24, and detects smaller dimension and intensity while the feature unit 22 is far from the detection unit 24), so as to determine the distance variation between the bottom surface 181 and the working surface S by the parameter difference. In addition, the feature unit 22 can be optionally disposed on a lateral surface 283 of the main body portion 28, as shown in FIG. 4, the detection unit 24 detects a shift difference of the feature unit 22, for example the feature unit 22 moves upward while the navigation device 10 is close to the working surface S and further moves downward while the navigation device 10 is spaced from the working surface S, to determine the distance variation between the bottom surface 181 and the working surface S.

Figure 5:
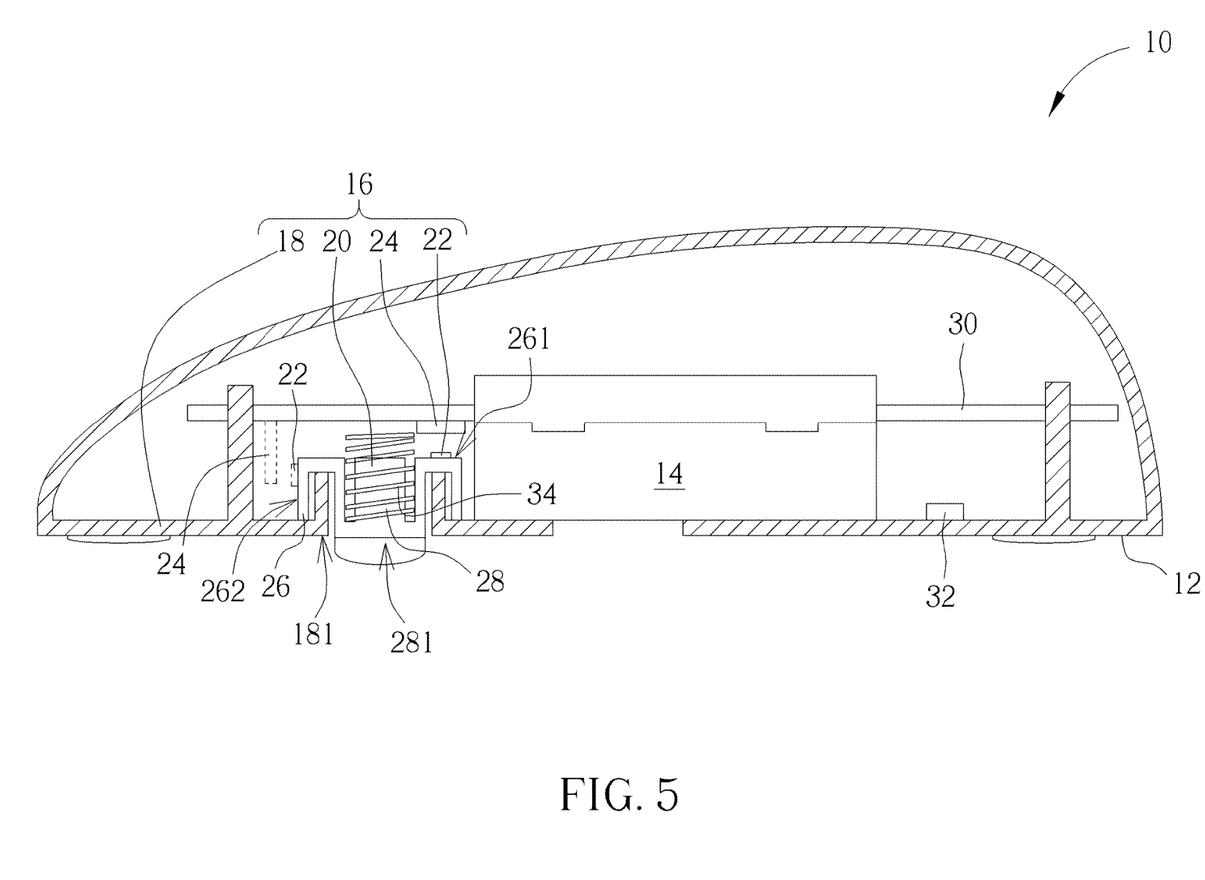
FIG. 5 is a sectional view of the navigation device in another possible variation according to the embodiment of the present invention.

The sliding portion 26 is preferably fixed onto the main body portion 28, and the feature unit 22 can be optionally disposed on an end 261 or a lateral surface 262 of the sliding portion 26. Please refer to FIG. 5. FIG. 5 is a sectional view of the navigation device 10 in another possible variation according to the embodiment of the present invention. The detection unit 24 is utilized to detect the dimension and/or intensity difference of the feature unit 22 (which is drawn by the unbroken line) on the end 261, or detect the shift difference of the feature unit 22 (which is drawn by the dotted line) on the lateral surface 262, so as to determine the distance variation of the connecting component 20 relative to the base 18 along the axial direction D1.

Figure 6:
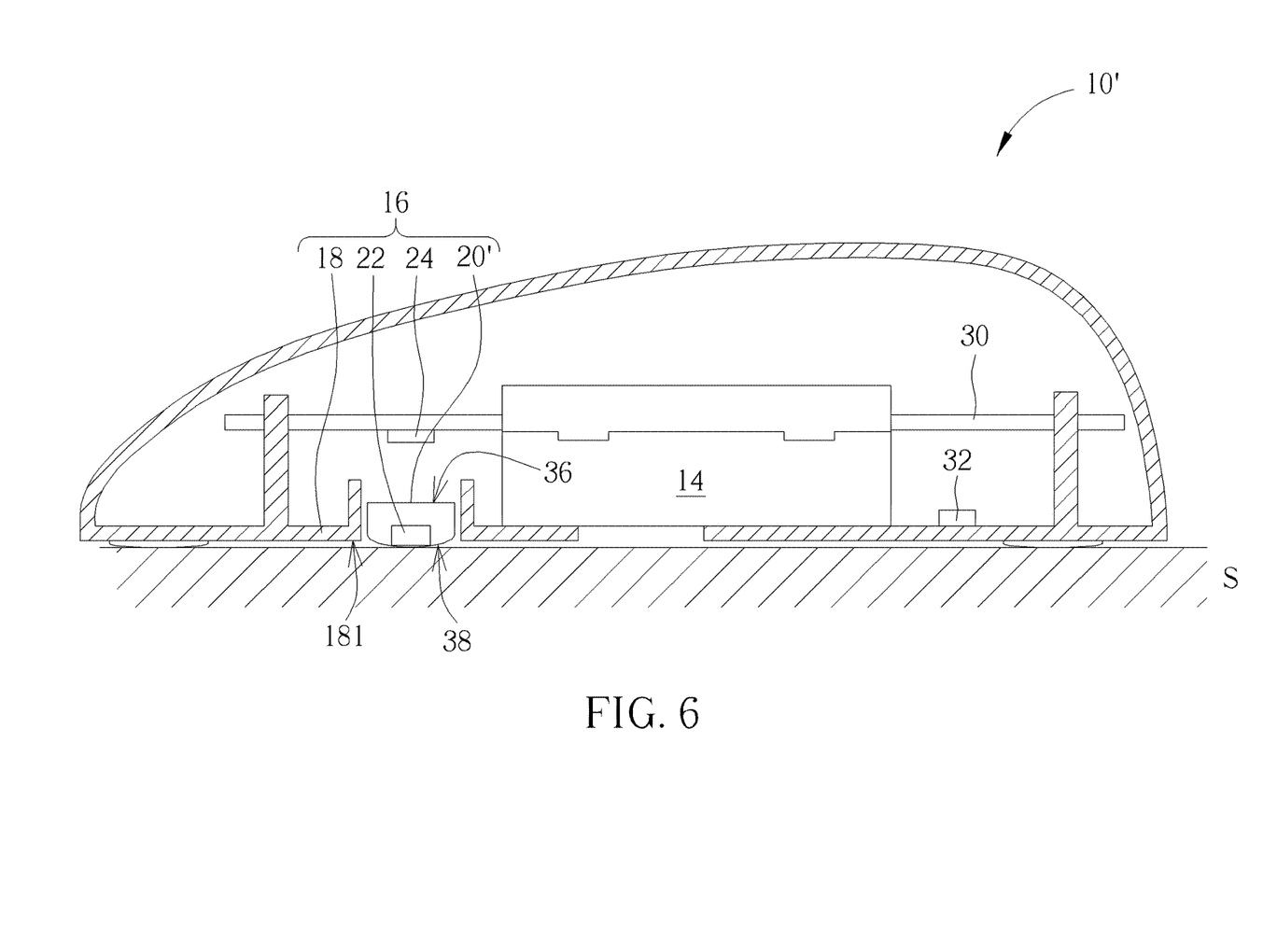
FIG. 6 and FIG. 7 respectively are sectional views of the navigation device according to different embodiments of the present invention.
Figure 7:
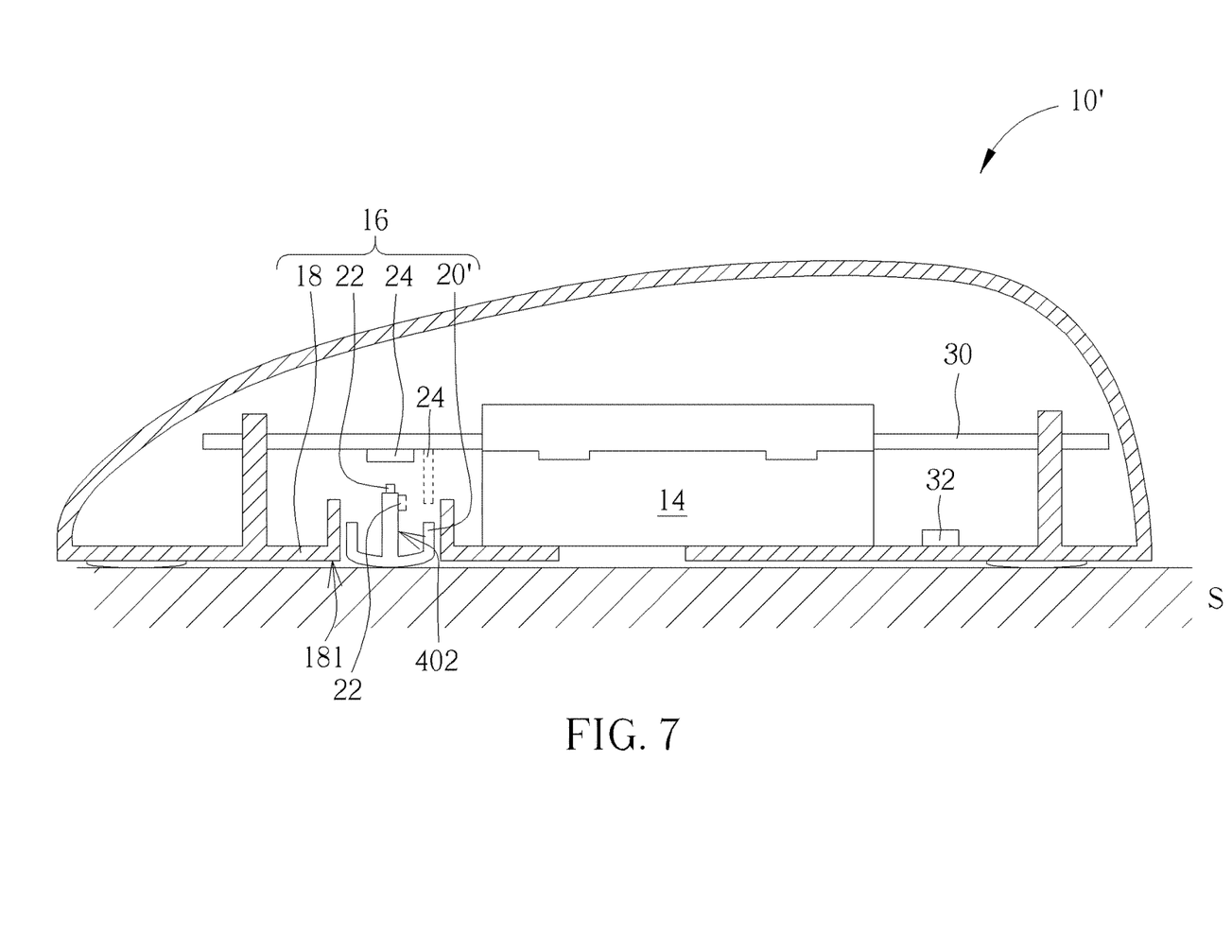

Please refer to FIG. 6 and FIG. 7. FIG. 6 and FIG. 7 respectively are sectional views of the navigation device 10' according to different embodiments of the present invention. In the embodiments, elements having the same numeral as ones of the other embodiment have the same structures and functions, and a detailed description is omitted herein for simplicity. As shown in FIG. 6, the connecting component 20' can be a hemisphere resilient structure made by rubber, and a shape and material of the connecting component 20' is not limited to the foresaid statement. The resilient structure has a fixed end 36 and a free end 38 opposite to each other. The fixed end 36 is disposed on the base 18, and the free end 38 protrudes from the bottom surface 181 to be out of the base 18. The feature unit 22 is disposed on a position of the free end 38 facing the detection unit 24. While the navigation device 10' contacts against the working surface S, the resilient structure is compressed and the free end 38 is moved into the base 18; while the navigation device 10' is spaced from the working surface S, the free end 38 is moved out of the base 18 by the resilient recovering force of the resilient structure, and the detection unit 24 can determine the distance variation of the bottom surface 181 relative to the working surface S in accordance with the dimension and/or intensity difference of the feature unit 22 on the free end 38.

As shown in FIG. 7, the connecting component 20' may dispose a stretching portion 40 inside the free end 38, the stretching portion 40 extends from the free end 38 toward the fixed end 36, and the feature unit 22 can be optionally disposed an end 401 or a side 402 of the stretching portion 40. While the feature unit 22 is disposed on the end 401 (which is drawn by the unbroken line), the detection unit 24 detects the dimension and/or intensity difference of the feature unit 22 to determine the distance variation of the connecting component 20' relative to the base 18; while the feature unit 22 is disposed on the side 402 (which is drawn by the dotted line), the detection unit 24 detects the shift difference of the feature unit 22 to determine information about the distance variation.

In conclusion, the navigation device of the present invention has the distance detecting mechanism utilizing the detection unit to detect the known feature unit on the connecting component without effect by material, surface roughness, dirty or dust on the working surface, and then the distance detecting mechanism can accurately calculate the lifting height of the navigation device relative to the working surface via the distance variation between the connecting component and the base. The connecting component of the distance detecting mechanism can protrude from the base in a movable manner to contact against the working surface, so as to generate the said distance variation by the resilient recovering force of the resilient component while the navigation device is lifted up or lowered down. The distance detecting mechanism not only can calculate the lifting height of the navigation device, but also can press and smooth down the working surface as the working surface is made of thin material (such like the paper) to accordingly increase detection accuracy of the coordinate detecting module. The navigation device utilizes setting of the threshold to adjust sensitivity of the distance detecting mechanism, as along as the distance variation between the connecting component and the base is greater than the threshold, the navigation device can be represented as being lifted up even through the connecting component still contacts against the working surface (which means the navigation device is not represented as being lifted up on condition that the connecting component is not spaced from the working surface), and the coordinate detecting module stops outputting the coordinate value.

Comparing to the prior art, the distance detecting mechanism of the present invention applies the movable assembly of the connecting component and the base to detect the feature unit on the known location by the detection unit, so that the distance detecting mechanism has advantages of accurate distance calculation and controlling adjustment, and can increase the detection accuracy of the coordinate detecting module by pressing the working surface.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A distance detecting mechanism capable of detecting a distance relative to a working surface, the distance detecting mechanism comprising:
   a base;
   a connecting component partly protruding from the base, the connecting component movably contacting against or being spaced from the working surface to generate a distance variation relative to the base along at least one axial direction;
   a feature unit disposed on the connecting component; and
   a detection unit connected to the base, the detection unit detecting parameter difference of the feature unit in accordance with the distance variation of the connecting component relative to the base, so as to determine the distance between the working surface and a bottom surface of the base via the parameter difference.

2. The distance detecting mechanism of claim 1, wherein the distance detecting mechanism is disposed inside a navigation device to detect a relative distance between the navigation device and the working surface, and the connecting component partly protrudes from the bottom surface of the base facing the working surface.

3. The distance detecting mechanism of claim 1, wherein the connecting component comprises:
   a sliding portion slidably disposed on the base; and
   a main body portion connected to the sliding portion, a first end of the main body portion protruding from the bottom surface of the base.

4. The distance detecting mechanism of claim 3, wherein the connecting component further comprises a resilient component disposed on the sliding portion or the main body portion, so as to provide a resilient recovering force to move the sliding portion and the main body portion relative to the base.

5. The distance detecting mechanism of claim 3, wherein the feature unit is disposed on a second end of the main body portion different from the first end, or disposed on a lateral surface of the main body portion.

6. The distance detecting mechanism of claim 3, wherein the feature unit is disposed on an end of the sliding portion, or disposed on a lateral surface of the sliding portion.

7. The distance detecting mechanism of claim 1, wherein the connecting component is a resilient structure having a fixed end and a free end opposite to each other, the fixed end is disposed on the base, the free end protrudes from the base, and the feature unit is disposed on the free end.

8. The distance detecting mechanism of claim 7, wherein the free end has a stretching portion extending toward the fixed end, and the feature unit is disposed on an end or a side of the stretching portion.

9. The distance detecting mechanism of claim 1, wherein the detection unit is adapted to detect a dimension difference, an intensity difference and/or a shift difference of the feature unit.

10. The distance detecting mechanism of claim 1, wherein the detection unit is adapted to determine the distance variation of the connecting component relative to the base along the at least one axial direction in accordance with the parameter difference.

11. A navigation device with distance detecting function and capable of detecting a distance relative to a working surface, the navigation device comprising:
a housing;
a coordinate detecting module disposed inside the housing and utilized to detect a coordinate movement of the housing relative to the working surface; and
a distance detecting mechanism disposed inside the housing, the distance detecting mechanism comprising:
a base located on a bottom of the housing;
a connecting component partly protruding from the base, the connecting component movably contacting against or being spaced from the working surface to generate a distance variation relative to the base along an at least one axial direction;
a feature unit disposed on the connecting component; and
a detection unit connected to the base, the detection unit detecting parameter difference of the feature unit in accordance with the distance variation of the connecting component relative to the base, so as to determine the distance between the working surface and a bottom surface of the base via the parameter difference.

12. The navigation device of claim 11, further comprising:
a controller electrically connected to the coordinate detecting module and the distance detecting mechanism, the controller being adapted to output a coordinate value generated by the coordinate detecting module while the distance is smaller than a threshold, and to stop outputting the coordinate value while the distance is greater than a threshold.

13. The navigation device of claim 11, wherein the connecting component comprises:
a sliding portion slidably disposed on the base; and
a main body portion connected to the sliding portion, a first end of the main body portion protruding from the bottom surface of the base.

14. The navigation device of claim 13, wherein the connecting component further comprises a resilient component disposed on the sliding portion or the main body portion, so as to provide a resilient recovering force to move the sliding portion and the main body portion relative to the base.

15. The navigation device of claim 13, wherein the feature unit is disposed on a second end of the main body portion different from the first end, or disposed on a lateral surface of the main body portion.

16. The navigation device of claim 13, wherein the feature unit is disposed on an end of the sliding portion, or disposed on a lateral surface of the sliding portion.

17. The navigation device of claim 11, wherein the connecting component is a resilient structure having a fixed end and a free end opposite to each other, the fixed end is disposed on the base, the free end protrudes from the base, and the feature unit is disposed on the free end.

18. The navigation device of claim 17, wherein the free end has a stretching portion extending toward the fixed end, and the feature unit is disposed on an end or a side of the stretching portion.

19. The navigation device of claim 11, wherein the detection unit is adapted to detect a dimension difference, an intensity difference and/or a shift difference of the feature unit.

20. The navigation device of claim 11, wherein the detection unit is adapted to determine the distance variation of the connecting component relative to the base along the at least one axial direction in accordance with the parameter difference.

* * * * *